United States Patent
Stoop

(10) Patent No.: US 11,394,322 B2
(45) Date of Patent: Jul. 19, 2022

(54) METHOD FOR RAPID CLOSED-LOOP CONTROL OF THE AVERAGE VALUE OF A CONTROLLED VARIABLE, DATA CARRIER WITH PROGRAM AS WELL AS MOTOR CONTROL UNIT FOR EXECUTING THE METHOD AND DRIVE MOTOR WITH SUCH A MOTOR CONTROL UNIT

(71) Applicant: Maxon International AG, Sachseln (CH)

(72) Inventor: Markus Stoop, Kerns (CH)

(73) Assignee: MAXON INTERNATIONAL AG, Sachseln (CH)

( * ) Notice: Subject to any disclaimer, the term of this patent is extended or adjusted under 35 U.S.C. 154(b) by 0 days.

(21) Appl. No.: 17/103,137

(22) Filed: Nov. 24, 2020

(65) Prior Publication Data

US 2021/0159821 A1 May 27, 2021

(30) Foreign Application Priority Data

Nov. 25, 2019 (EP) ..................... 19211175

(51) Int. Cl.
*H02P 6/06* (2006.01)
*F04B 43/04* (2006.01)

(52) U.S. Cl.
CPC ....................... *H02P 6/06* (2013.01)

(58) Field of Classification Search
CPC .................. F04B 43/04; H02P 6/06
See application file for complete search history.

(56) References Cited

U.S. PATENT DOCUMENTS

| 4,145,161 A * | 3/1979 | Skinner ............... H02P 23/14 417/45 |
| 6,599,095 B1 * | 7/2003 | Takada ................ F04B 47/02 417/42 |

(Continued)

FOREIGN PATENT DOCUMENTS

EP 2498395 A2 9/2012

OTHER PUBLICATIONS

Extended European Search Report for European Application No. 19211175 dated May 20, 2020.

*Primary Examiner* — Thai T Dinh
(74) *Attorney, Agent, or Firm* — Buchanan Ingersoll & Rooney PC

(57) ABSTRACT

A method for closed-loop control of a controlled variable to a given reference variable. The actual value and/or the measured actual value of the controlled variable is/are influenced by a fluctuating effect with a certain periodicity. The controlled variable is readjusted if there is a control difference between the reference variable and an average value of the actual value averaged over the period duration of the periodicity. Measurement values are determined within the period duration of each periodicity at measurement time points in a certain controller cycle, these measurement values correlating with a respective actual value or corresponding to the actual value, and/or being adapted to determine therefrom the control difference between the reference variable and the average value of the actual value. The control difference is determined at each measurement time point and the controlled variable is selectively readjusted.

14 Claims, 2 Drawing Sheets

(56) References Cited

U.S. PATENT DOCUMENTS

Figure 1:
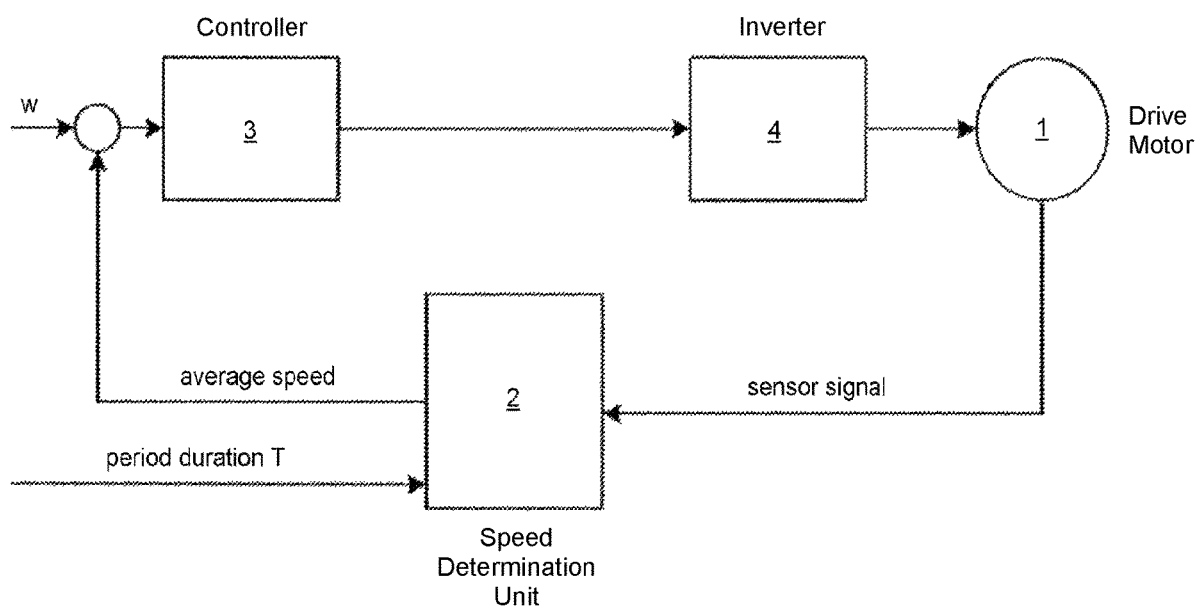

| | | | |
|---|---|---|---|
| 8,810,190 B2* | 8/2014 | Kelley | H02P 23/02 |
| | | | 318/812 |
| 10,018,096 B2* | 7/2018 | Wallimann | F04B 43/04 |
| 10,519,830 B2* | 12/2019 | Andreis | F01N 13/009 |
| 2008/0071414 A1 | 3/2008 | Fujita et al. | |
| 2008/0251307 A1* | 10/2008 | Bell | B60W 40/064 |
| | | | 180/170 |
| 2015/0134125 A1* | 5/2015 | Dedow | D06F 37/36 |
| | | | 700/279 |
| 2015/0345490 A1* | 12/2015 | Bremeier | H02P 1/24 |
| | | | 417/22 |
| 2017/0047874 A1* | 2/2017 | Shih | H02P 7/2855 |
| 2019/0160213 A1* | 5/2019 | Wampler | A61M 60/148 |

* cited by examiner

METHOD FOR RAPID CLOSED-LOOP CONTROL OF THE AVERAGE VALUE OF A CONTROLLED VARIABLE, DATA CARRIER WITH PROGRAM AS WELL AS MOTOR CONTROL UNIT FOR EXECUTING THE METHOD AND DRIVE MOTOR WITH SUCH A MOTOR CONTROL UNIT

The present invention relates to a method for closed-loop control of a controlled variable to a given reference variable.

In the case of the method of the generic kind, the actual value and/or the measured actual value of the controlled variable is/are influenced by a fluctuating effect with a certain periodicity. This is the case, for example, when the speed of a drive motor, which is used to drive an eccentric drive or to drive a diaphragm pump or a piston pump or to drive a unidirectional lifting and/or conveying system or which is used for mechanisms having a load applied thereto only in one direction of movement, is to be closed-loop controlled. Furthermore, this is also the case if a rotary encoder used to determine the rotor position and the speed of a drive motor exhibits, for example, a pitch error or inaccuracies, through which the measured actual values of the controlled variable are periodically influenced in deviation from the real actual value of the controlled variable. Such inaccuracies may arise e.g. when the encoder is mounted.

In addition, the controlled variable is only readjusted in the case of the method of the generic kind, if there is a control difference between the reference variable and an average value of the actual value of the controlled variable averaged over the period duration of the periodicity. For this purpose, measurement values $M_1$ to $M_n$ are determined within the period duration of each periodicity at concrete measurement time points $t_1$ to $t_n$ in a certain controller cycle, these measurement values correlating with the respective actual value of the controlled variable or corresponding to the actual value of the controlled variable, and/or being adapted to determine therefrom the control difference between the reference variable and the average value of the actual value of the controlled variable. The number n of measurement time points within the period duration of a periodicity corresponds to the number n of associated measurement values.

The prior art discloses fast classic controllers, which try to compensate for fluctuations of the controlled variable within a load period. Thinking of a speed controller, by way of example, this has the effect that in phases in which the load absorbs little energy or even returns energy to the drive, unnecessary deceleration will be caused by the closed-loop control, whereas in phases in which more energy is again required to manage the load, additional energy must be provided to compensate for the directly preceding deceleration phase. In this case, the system cannot benefit from the mass moment of inertia of the load. A very soft or slow closed-loop control or an open-loop-controlled, but not closed-loop-controlled drive allows, however, larger speed variations within a load period and thus also benefits from the mass moment of inertia of the load. However, a soft closed-loop control may perhaps respond too slowly to changes in the reference variable or to changes in the mean controlled variable. An open loop-controlled, but not closed loop-controlled drive does not even react at all to changes in the mean controlled variable or to changes in the load.

A method of the generic kind is known e.g. from EP 2498395 A2. This reference describes a method of closed-loop control of the speed of an electric motor, in which an average value of the actual speed is used for establishing for the following rotation a lookup table with pulse width modulation values adapted to the expected load on the motor. The method known from this reference is comparatively complex and requires a high computing power. In addition, the method is improvable as regards the response time of the closed-loop control.

Therefore, it is the object of the present invention to provide a method of the generic kind, which allows a fast reaction to changes in the average value of the controlled variable and which, in so doing, avoids the above mentioned problems of conventional fast controllers and requires little computing power.

According to these features, an inventive solution exists in the case of a method when the control difference is determined at each concrete measurement time point $t_1$ to $t_n$ and when the controlled variable is readjusted, if necessary.

The actual sampling rate of a sensor used for determining the actual value of the controlled variable or a correspondingly correlating variable is preferably equated with the controller cycle, but may also deviate from the controller cycle, so that the actual measurement time points may possibly deviate from the measuring time points lying within the controller cycle, and the measurement values may thus possibly have only approximate validity.

According to a particularly preferred embodiment of the method according to the present invention, a differential value between the measurement value at the current measurement time point and the respective measurement value of the preceding periodicity that was recorded n measurement time points earlier is calculated for determining the control difference, the control difference being derived from this differential value. If the period duration of the periodicity does not change, but remains constant, the current measurement value is thus compared with a measurement value recorded one period duration earlier in the past. This embodiment does not require large computing power. The control difference can be determined quickly and with the aid of inexpensive hardware. If the difference between the measurement value at the current measurement time point and the respective measurement value recorded n measurement time points earlier is equal to zero, it can be assumed, according to a simplified determination of the control difference, that no control difference exists.

According to an alternative embodiment of the method according to the present invention it is also possible to calculate, for determining the control difference, the actual average value of the controlled variable from the measurement value at the current measurement time point as well as from the n−1 measurement values of the earlier n−1 measurement time points. For calculating the control difference, the difference between the reference variable and this average value can then be calculated. This embodiment requires a slightly larger computing power.

According to a further preferred embodiment of the method according to the present invention, the controller cycle is chosen such that at least six measurement time points lie within the period duration of the periodicity. This demand preferably also applies to the actual sampling rate of a sensor used for determining the actual value of the controlled variable or a respective correlating variable. This embodiment ensures that the measurement values allow the determination of a meaningful and correct control difference. According to a particularly preferred embodiment, the controller cycle is chosen such that at least twelve measurement time points lie within the period duration of the periodicity. According to another preferred embodiment, the sampling time of the controller cycle is 1 ms at most.

According to a further preferred embodiment of the method according to the present invention, the period duration of the periodicity is determined continuously by evaluating the measurement values. The determination of the period duration of the periodicity is further preferably carried out by the same controller unit that is also used to control the controlled variable. On the one hand, this increases the reliability and, on the other hand, it keeps the costs for the necessary hardware on a low level. According to an alternative embodiment of the method according to the present invention, a fixed period of periodicity can be predetermined for the controller unit, or an external source may be used, which transmits the period duration to the controller unit.

According to a particularly preferred embodiment of the method according to the present invention, the actual value of the controlled variable is influenced by a fluctuating load with a certain load period.

According to another particularly preferred embodiment of the method according to the present invention, the measured actual value of the controlled variable is influenced by periodic measurement errors within a measurement period, in particular by pitch errors or inaccuracies in a material measure of a rotary encoder. Preferably, the rotary encoder in question is a magnetic, an optical, an inductive or a capacitive rotary encoder.

According to another particularly preferred embodiment, the method relates to a method for closed-loop control of a drive motor, the controlled variable being the speed of the drive motor.

The present invention also provides a machine-readable data carrier with a program, wherein the data carrier is associated with the motor control unit of a drive motor, and wherein the program comprises a sequence of instructions, which, when executed by a processor, lead to execution of the method according to the present invention, in particular of a method according to one of the above described embodiments.

In addition, the present invention also provides a motor control unit for a drive motor, the motor control unit being configured to and adapted to execute the method according to the present invention, in particular a method according to one of the above described embodiments.

Furthermore, the present invention also provides a drive motor, which comprises a rotor as well as a motor control unit according to the present invention. According to a particularly preferred embodiment, the drive motor is an electric motor.

According to a preferred embodiment of the present invention, the drive motor comprises at least one sensor for detecting the position or location or speed of the rotor, wherein the motor control unit is configured to calculate the control difference on the basis of measurement values provided by the sensor. In this respect, it will be particularly advantageous when the drive motor is an electric motor, the sensor being a Hall sensor whose signal is also used for commutating the electric motor. This embodiment ensures production at a reasonable price.

According to a further embodiment, the motor control unit is configured to calculate the control difference on the basis of values which it generates, without making use of a sensor, on the basis of the parameters inductance and electromagnetic force by an algorithm for determining the position or location or speed of the rotor. The algorithm in question is a so-called sensorless control algorithm of the type described e.g. in the patent applications EP 2 924 870 A1 and EP 3 288 175 A1.

Figure 2:
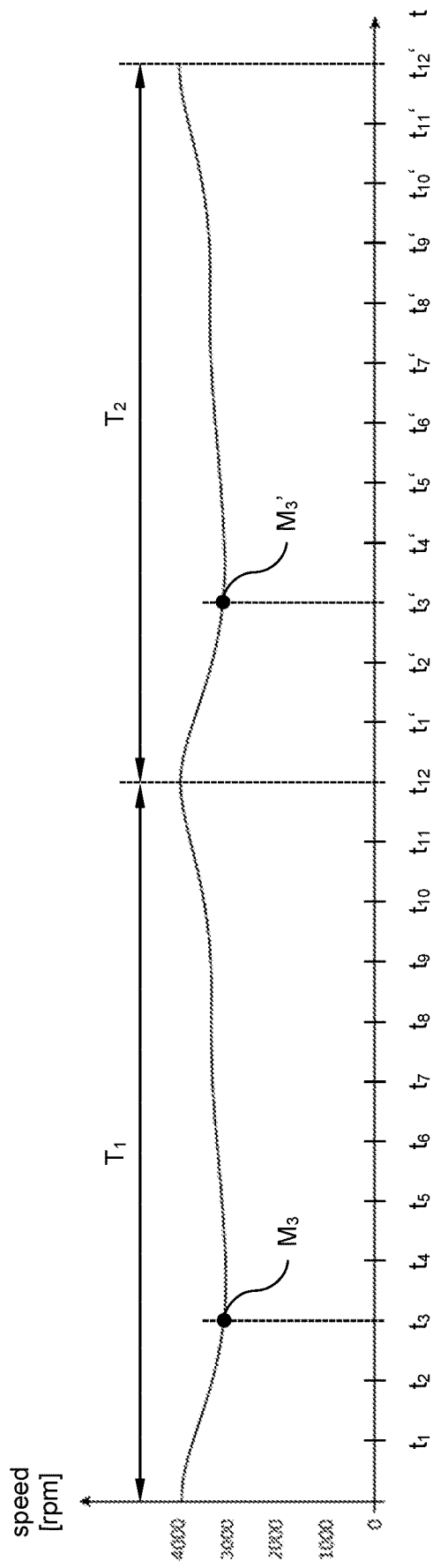

Embodiments of the present invention will be explained in more detail hereinafter on the basis of drawings, in which FIG. 1 shows a schematic flowchart of a method according to the present invention used for closed-loop control of the speed of an electric motor, and FIG. 2 shows the associated speed curve of the electric motor.

In the statements following hereinafter, like components will be identified by like reference numerals. If a figure comprises reference numerals, which are not dealt with in detail in the associated description of the figure, reference is made to preceding or subsequent descriptions of a figure.

FIG. 1 shows a schematic flowchart of a method according to the present invention used for closed-loop control of the speed of an electric motor 1 connected to a fluctuating load, e.g. a diaphragm pump or a piston pump, having a certain load period. However, the flowchart shown here is, alternatively, also suitable for use with a rotary encoder exhibiting pitch errors or inaccuracies in its material measure within a specific measurement period. In FIG. 2, which shows the actual speed curve of the electric motor over the time t, two complete successive period durations $T_1$ and $T_2$ are shown. It can easily be seen that the actual speed reaches a maximum at the beginning and at the end of each period duration. These are therefore periodically recurring load characteristics, which lead to correspondingly periodically recurring speed characteristics of the electric motor. In the case shown, the period duration does not change. The period duration $T_2$ thus corresponds to the period duration $T_1$. The method works optimally, if the load changes correlate with the angle of rotation of the drive and exhibit a single or multiple periodicity to the speed of the electric motor. At this point, however, reference is made to the fact that the method according to the present invention will also be suitable for use, if the position of the changes of load and/or the period duration change slowly in relation to the controller cycle and/or the sampling rate. Likewise, also the load change characteristics may change slowly in relation to the controller cycle and/or the sampling rate.

The electric motor 1, which is shown only schematically in FIG. 1, has, for the purpose of commutation, at least one Hall sensor whose sensor signal can be used to determine the rotor position or the rotor speed and, in the case of the method according to the present invention, can serve to determine an average value of the actual speed averaged over the period duration T of the load period. To this end, the sensor signal is fed to the speed determination unit 2, which also takes into account the period duration T for determining the average speed. In some systems, the motor control unit may operate with a fixedly predetermined period duration under certain circumstances. Normally, however, it will be necessary to continuously determine the period duration and transmit it to the speed determination unit 2. This can be done e.g. by the motor control unit itself, in particular by an appropriate evaluation of the sensor signal, or by an external evaluation unit.

In the case of the embodiment shown in FIG. 2, the controller cycle and/or the sampling rate, have been chosen such that a total of twelve measurement values ($M_1$ to $M_{12}$ within period duration $T_1$; $M_1'$ to $M_{12}'$ within period duration $T_2$) is determined for each load period at a total of twelve concrete points in time ($t_1$ to $t_{12}$ within period duration $T_1$; $t_1'$ to $t_{12}'$ within period duration $T_2$). At each concrete point in time, an average value for the speed of the electric motor can be calculated on the basis of the respective current measurement value and the eleven measurement values measured immediately before. As shown in FIG. 1, this average value can then be compared with the respective reference variable w, which corresponds to the target speed. The respective resultant control difference is fed to the actual controller 3 of the motor control unit. This controller, in turn, transmits respective default values to the inverter 4, which supplies the individual phases of the electric motor 1 with voltage.

Instead of calculating an average value of the motor speed at each measurement time point from the current measurement value and the eleven measurement values recorded immediately before, the control difference may alternatively also be determined, as indicated in FIG. 2, by calculating the difference between the current measurement value and the measurement value of the preceding load period that was recorded 12 measurement time points earlier. In this respect, FIG. 2 shows exemplarily the measurement values $M_3'$ of the second load period $T_2$ and $M_3$ of the first load period $T_1$. If the difference between the measurement value at the current measurement time point and the respective measurement value recorded 12 measurement time points earlier is equal to zero, it can be assumed, according to a simplified determination of the control difference, that no control difference exists.

LIST OF REFERENCE NUMERALS 1 drive motor/electric motor
2 speed determination unit
3 controller
4 inverter
T, $T_1$, $T_2$ period duration of the periodicity or load period and/or measurement period
$t_1$ to $t_n$ measurement time points during the first period duration
$t_1'$ to $t_n'$ measurement time points during the second period duration
$M_1$ to $M_n$ measurement values during the first period duration
$M_1'$ to $M_n'$ measurement values during the second period duration
n number of measurement time points/measurement values
w reference variable (target value of speed)

The invention claimed is:

1. A method for closed-loop control of a speed of a drive motor to a given reference variable (w), wherein an actual value and/or a measured actual value of the speed of the drive motor is/are influenced by a fluctuating effect with a certain periodicity, the method comprising:
readjusting the speed of the drive motor only when there is a control difference between the reference variable (w) and an average value of the actual value of the speed of the drive motor averaged over a period duration (T, $T_1$, $T_2$) of the periodicity;
determining measurement values ($M_1$ to $M_n$, $M_1'$ to $M_n'$) within the period duration (T, $T_1$, $T_2$) of each periodicity at concrete measurement time points ($t_1$ to $t_n$, $t_1'$ to $t_n'$) in a certain controller cycle, these measurement values correlating with a respective actual value of the speed of the drive motor or corresponding to the actual value of the speed of the drive motor, and/or being adapted to determine therefrom the control difference between the reference variable (w) and the average value of the actual value of the speed of the drive motor; and
determining the control difference at each concrete measurement time point ($t_1$ to $t_n$, $t_1'$ to $t_n'$) and selectively readjusting the speed of the drive motor.

2. The method according to claim 1, comprising:
for determining the control difference, calculating a differential value between the measurement value at the current measurement time point and the respective measurement value of a preceding periodicity that was recorded n measurement time points earlier, the control difference being derived from this differential value.

3. The method according to claim 2, comprising:
for determining the control difference, calculating the actual average value of the speed of the drive motor from the measurement value at the current measurement time point as well as from an n−1 measurement values of the earlier n−1 measurement time points.

4. The method according to claim 3, comprising:
choosing the controller cycle such that at least six measurement time points ($M_1$ to $M_n$, $M_1'$ to $M_n'$) lie within the period duration (T, $T_1$, $T_2$) of the periodicity.

5. The method according to claim 4, comprising:
choosing the controller cycle such that at least twelve measurement time points ($M_1$ to $M_n$, $M_1'$ to $M_n'$) lie within the period duration (T, $T_1$, $T_2$) of the periodicity.

6. The method according to claim 5, comprising:
determining the period duration (T, $T_1$, $T_2$) of the periodicity continuously by evaluating the measurement values ($M_1$ to $M_n$, $M_1'$ to $M_n'$).

7. The method according to claim 1, wherein the actual value of the speed of the drive motor is influenced by a fluctuating load with a certain load period.

8. The method according to claim 1, wherein the measured actual value of the speed of the drive motor is influenced by periodic measurement errors within a measurement period, due to pitch errors or inaccuracies in a material measure of a rotary encoder.

9. A non-transitory computer readable medium containing a computer readable program, wherein the non-transitory computer readable medium is configured for a motor control unit of a drive motor, and wherein the computer readable program is a sequence of instructions, which, when executed by a processor, will cause the processor to execute a method according to claim 1.

10. A motor control unit for a drive motor, the motor control unit comprising:
a processor configured to and adapted to execute a set of computer readable instructions for causing the processor to perform closed-loop control of a speed of a drive motor to a given reference variable (w), wherein an actual value and/or a measured actual value of the speed of the drive motor is/are influenced by a fluctuating effect with a certain periodicity, the processor being configured to execute steps of:
readjust the speed of the drive motor only when there is a control difference between the reference variable (w) and an average value of the actual value of the speed of the drive motor averaged over a period duration (T, $T_1$, $T_2$) of the periodicity;
determine measurement values ($M_1$ to $M_n$, $M_1'$ to $M_n'$) within the period duration (T, $T_1$, $T_2$) of each periodicity at concrete measurement time points ($t_1$ to $t_n$, $t_1'$ to $t_n'$) in a certain controller cycle, these measurement values correlating with a respective actual value of the speed of the drive motor or corresponding to the actual value of the speed of the drive motor, and/or being adapted to determine therefrom the control difference between the reference variable (w) and the average value of the actual value of the speed of the drive motor; and determine the control difference at each concrete measurement time point ($t_1$ to $t_n$, $t_1'$ to $t_n'$) and selectively readjusting the speed of the drive motor.

11. A motor control unit according to clam 10, in combination with a drive motor wherein the drive motor comprises:
a rotor; and
the motor control unit.

12. The motor control unit and drive motor combination according to claim 11, wherein the drive motor comprises:
at least one sensor for detecting a position or location or speed of the rotor, wherein the motor control unit is configured to determine the control difference on a basis of measurement values provided by the sensor.

13. The motor control unit and drive motor combination according to claim 12, wherein the drive motor (1) is an electric motor, the sensor being a Hall sensor whose signal is also configured for commutating the electric motor.

14. A drive motor comprising:
a rotor; and
a motor control unit configured to and adapted to execute closed-loop control of a speed of the drive motor to a given reference variable (w), wherein an actual value and/or a measured actual value of the speed of the drive motor is/are influenced by a fluctuating effect with a certain periodicity, the motor control unit being configured to:

readjust the speed of the drive motor only when there is a control difference between the reference variable (w) and an average value of the actual value of the speed of the drive motor averaged over a period duration (T, $T_1$, $T_2$) of the periodicity;

determine measurement values ($M_1$ to $M_n$, $M_1'$ to $M_n'$) within the period duration (T, $T_1$, $T_2$) of each periodicity at concrete measurement time points ($t_1$ to $t_n$, $t_1'$ to $t_n'$) in a certain controller cycle, these measurement values correlating with a respective actual value of the speed of the drive motor or corresponding to the actual value of the speed of the drive motor, and/or being adapted to determine therefrom the control difference between the reference variable (w) and the average value of the actual value of the speed of the drive motor; and determine the control difference at each concrete measurement time point ($t_1$ to $t_n$, $t_1'$ to $t_n'$) and selectively readjusting the speed of the drive motor;

wherein the drive motor is an electric motor and the motor control unit is additionally configured to calculate the control difference on a basis of values which it generates, without making use of a sensor, on a basis of the parameters inductance and electromagnetic force by an algorithm for determining a position or location or speed of the rotor.

* * * * *